(12) United States Patent
Burst et al.

(10) Patent No.: US 7,499,928 B2
(45) Date of Patent: Mar. 3, 2009

(54) OBTAINING AND DISPLAYING INFORMATION RELATED TO A SELECTION WITHIN A HIERARCHICAL DATA STRUCTURE

(75) Inventors: Alexandru D. Burst, Bellevue, WA (US); David Koronthaly, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 413 days.

(21) Appl. No.: 10/966,944

(22) Filed: Oct. 15, 2004

(65) Prior Publication Data

US 2006/0085438 A1    Apr. 20, 2006

(51) Int. Cl.
*G06F 17/30*   (2006.01)
(52) U.S. Cl. .................. 707/101; 707/104.1; 717/140
(58) Field of Classification Search .................. 707/10, 707/101, 102, 104.1; 717/140
See application file for complete search history.

(56) References Cited

U.S. PATENT DOCUMENTS

| | | | | |
|---|---|---|---|---|
| 6,144,975 | A | 11/2000 | Harris et al. ................ | 715/500 |
| 6,169,992 | B1* | 1/2001 | Beall et al. ............. | 707/103 R |
| 7,031,961 | B2 | 4/2006 | Pitkow et al. .................. | 707/4 |
| 2001/0029455 | A1* | 10/2001 | Chin et al. .................. | 704/277 |
| 2002/0016786 | A1* | 2/2002 | Pitkow et al. .................. | 707/3 |
| 2002/0033844 | A1* | 3/2002 | Levy et al. .................. | 345/744 |
| 2002/0036662 | A1 | 3/2002 | Gauthier et al. ............. | 345/835 |
| 2002/0124028 | A1* | 9/2002 | Kroeger ...................... | 707/530 |
| 2002/0130899 | A1* | 9/2002 | Ryan et al. .................. | 345/738 |
| 2002/0133516 | A1 | 9/2002 | Davis et al. ................. | 707/513 |
| 2002/0133518 | A1* | 9/2002 | Landsman et al. .......... | 707/513 |
| 2002/0133627 | A1 | 9/2002 | Maes et al. ................. | 709/246 |
| 2002/0143808 | A1 | 10/2002 | Miller et al. ............. | 707/501.1 |
| 2002/0143821 | A1* | 10/2002 | Jakubowski ................ | 707/522 |
| 2002/0143853 | A1* | 10/2002 | Isaac et al. .................. | 709/201 |
| 2002/0152244 | A1* | 10/2002 | Dean et al. .................. | 707/530 |
| 2002/0194601 | A1 | 12/2002 | Perkes et al. .................. | 725/44 |
| 2003/0041047 | A1* | 2/2003 | Chang et al. .................... | 707/1 |
| 2004/0098391 | A1 | 5/2004 | Robertson et al. ............. | 707/10 |
| 2004/0168115 | A1* | 8/2004 | Bauernschmidt et al. .... | 715/500 |
| 2004/0205514 | A1 | 10/2004 | Sommerer et al. ....... | 715/501.1 |
| 2005/0091188 | A1* | 4/2005 | Pal et al. ........................ | 707/1 |

(Continued)

FOREIGN PATENT DOCUMENTS

EP           1510937 A1     3/2005

OTHER PUBLICATIONS

InfoPath 2003 Product Overview, Microsoft Office Online, Published: Mar. 10, 2003 (3 pages) http://www.microsoft.com/office/infopath/prodinfo/overview.mspx.

(Continued)

*Primary Examiner*—Leslie Wong
(74) *Attorney, Agent, or Firm*—Perkins Coie LLP (57) ABSTRACT

A facility for obtaining information related to a selection within a hierarchical data structure is provided. The facility detects a selection of a node in a hierarchical data structure, and determines whether the node is a significant node. Responsive to determining that the currently selected node is a significant node, the facility transforms the significant node into a format suitable for retrieving additional information related to the significant node. For example, the format may include a context, which identifies a piece of metadata, and at least one item of data from the hierarchical data structure. The facility then obtains the additional information.

31 Claims, 4 Drawing Sheets

```
<Stops>         102
    <Stop HotelName="BestInn">
        104   <Address City = "Bellevue"/>
        </Stop>
    110
        <Stop Location = "Whistler"/>
    108
        <Stop HotelName = "WonderfulResort">
            106   <Address City = "Vancouver"/>
        </Stop>
</Stops>
```

U.S. PATENT DOCUMENTS

| | | | |
|---|---|---|---|
| 2005/0108217 A1 | 5/2005 | Werner et al. | 707/3 |
| 2005/0257139 A1 | 11/2005 | Burst et al. | 715/513 |
| 2006/0048109 A1* | 3/2006 | Thiagarajan et al. | 717/140 |
| 2006/0095285 A1 | 5/2006 | Sol et al. | 705/1 |
| 2006/0265359 A1 | 11/2006 | Burst et al. | 707/3 |

OTHER PUBLICATIONS

Introduction to Developing Smart Documents, Microsoft Office 2003 Smart Documents, Copyright 2003 Microsoft Corporation (2 pages) http://msdn.microsoft.com/library/en-us/sdsdk/html/sdconDevelopingSolutionsIntroduction.

* cited by examiner

```
<Stops>       102
    <Stop HotelName="BestInn">
  104      <Address City = "Bellevue"/>
       </Stop>
110
       <Stop Location = "Whistler"/>
108
       <Stop HotelName = "WonderfulResort">
  106      <Address City = "Vancouver"/>
       </Stop>
</Stops>
```

*FIG. 1*

Computer System 200

- 202 CPU
- 204 Memory
- 206 Persistent Storage
- 208 Computer-Readable Media Drive
- 210 Network Connection

OBTAINING AND DISPLAYING INFORMATION RELATED TO A SELECTION WITHIN A HIERARCHICAL DATA STRUCTURE

TECHNICAL FIELD

The described technology is directed generally to retrieving and displaying information related to a document and, more particularly, to retrieving and displaying information related to nodes in a hierarchical document.

BACKGROUND

Today, more than ever, the success of an organization depends largely on the ability of its members to act on information. With the advent and proliferation of computer technology, information is typically maintained in electronic documents, which constitute disconnected islands of information. However, it may be desirable for an author or a reader of the document to be able to view information related to the content of a document but not contained in the document itself.

By way of one example, different users may be interested in different related data. For example, in the case of a document about a book, a librarian may wish to see information regarding the shelf where the book is stored, whereas a publishing company may wish to see information about when that book started selling in paperback. If all of the data is included in the document, everyone would see the same data.

By way of another example, if the related information is quickly changing (for example, stock quotes), it may be preferable that the document contain only the unchanging information, such as the name and address of the company, and the quickly changing related information be maintained outside of the document and obtained only when requested, for example, by a user interested in the stock quote information. This avoids the problems related to duplication of information such as synchronization, storage space, etc.

Hierarchical data structures are one type or subclass of such documents. In a typical hierarchical data structure, such as an Extensible Markup Language (XML) document, the information is commonly organized in a hierarchical manner, which refers to an organization that is in the shape of a pyramid, where, starting from a "root," each row of object(s) is linked to objects directly beneath it. Given such a document and a current selection within the document, it is desirable to obtain and view information related to the current selection within the document, where the information is not contained within the document itself.

A hard coded reference is one technology that enables an author or a reader of a document to view information related to the content of a document but not contained in the document itself. For example, in a hypertext document, a reference is a link—e.g., hyperlink—from some object in the hypertext document to some point in another document or in the same document. These references are particularly useful for organizing large amounts of information, both inside and outside the document. A major drawback to using these references is that they are hard coded within the document, which requires intimate knowledge of the data/information that is being linked. For example, to provide a proper reference within a document to data outside of the document, the exact location of the data outside of the document is needed. If the location of this data changes, the hard coded reference in the document also must be changed to reflect the changed location.

Accordingly, a technique for obtaining and viewing information related to the hierarchy of nodes within a hierarchical data structure that contain a current selection without requiring intimate knowledge of the related information will have significant utility.

DETAILED DESCRIPTION

A software facility for obtaining and viewing information related to a hierarchy of nodes that contain a current user selection within a hierarchical data structure ("the facility") is described. In some embodiments, the facility integrates with a host application—e.g., an application in which a document is viewed, such as Microsoft® Office Word—and with a line-of-business ("LOB") data provider—e.g., a back-end system that contains/provides data related to the document. From a current user selection within the hierarchical data structure, the facility determines whether a particular node is "significant" for purposes of obtaining the related information from the LOB system, transforms each significant node into a format that can be used to retrieve the additional information related to that node, and retrieves the displays the additional information in a manner that minimizes requests to the back-end LOB system.

Throughout the description, the following terms will generally have the following meanings:

The term "action" refers to a sequence of one or more operations that are made available by a LOB system. In some embodiments, an action may be specified in the metadata as a sequence of one operation that binds to a transformation.

The term "context" refers, in the abstract, to a means to identify a correct piece of metadata. In some embodiments, a context is comprised of a scope and one or more of an entity, a view, or a reference schema name. For example, a context may be comprised of a scope+entity, scope+entity+view, or scope+entity+view+reference schema name.

The term "entity" refers to a metadata representation of an object exposed or made available by a LOB system.

The term "metadata" refers to data about data. In some embodiments, metadata is used to describe actions, entities, references, transformations, views, and other objects exposed and/or made available by a LOB system.

The term "reference" refers to data that, when associated with the correct piece of metadata, forms a key into the LOB data. In some embodiments, a reference may be an identifier that serves to retrieve data from a LOB system.

The term "schema" refers to a definition of the shape or structure of the data, such as views, references, transformations, etc.

The term "scope" or "metadata scope" refers to a logical grouping or partition within the metadata. Metadata scopes are used to separate different logical pieces of the metadata. In some embodiments where the facility interacts with more than one LOB system, the metadata may be separated into unique metadata scopes for each distinct LOB system.

The term "transformation" refers to a mapping that describes how to obtain or filter the relevant data in the document from all the data (both relevant and irrelevant) present or available. In some embodiments, a transformation is represented as an XSLT fragment that can be applied to all the XML data in a document to construct a relevant XML fragment.

The term "view" refers to a description of how and what a user can see about an entity.

The various embodiments of the facility and its advantages are best understood by referring to FIG. 1-4 of the drawings. The elements of the drawings are not necessarily to scale, emphasis instead being placed upon clearly illustrating the principles of the invention. Throughout the drawings, like numerals are used for like and corresponding parts of the various drawings.

Figure 1:
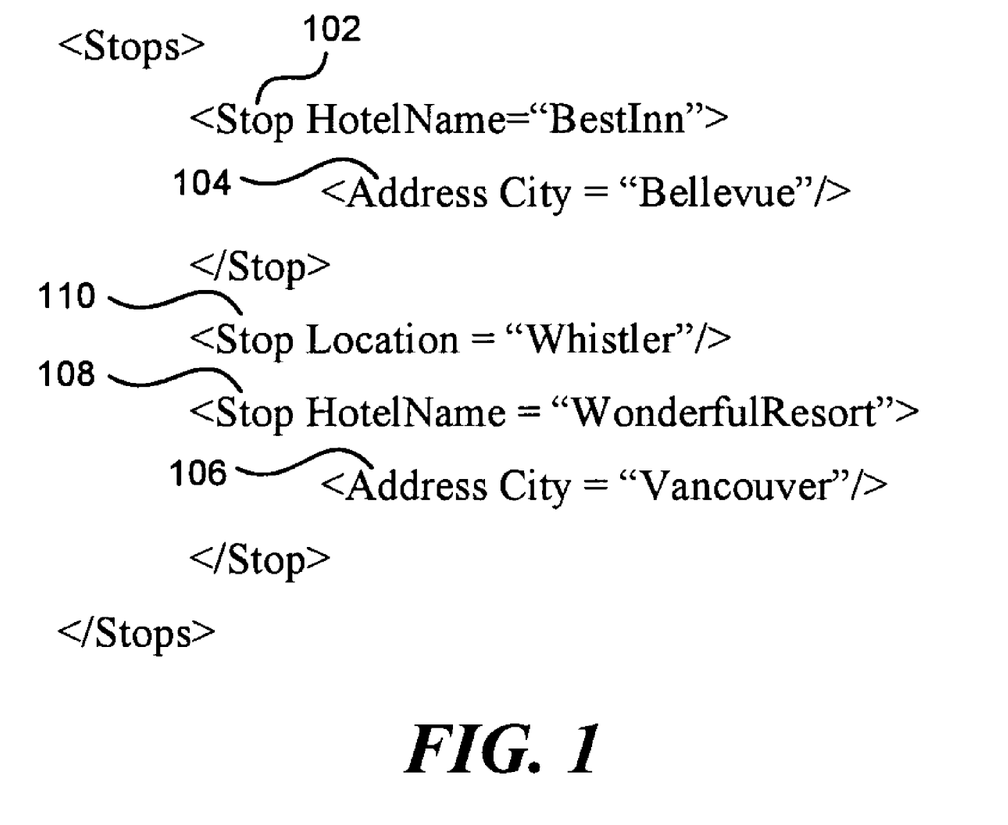
FIG. 1 illustrates an example structure of a travel itinerary represented by a hierarchical data structure.

By way of example, the facility may be used to display information related to a travel itinerary represented by a hierarchical data structure as illustrated in FIG. 1. As depicted, the hierarchical data structure is an XML document. Assuming that the XML document containing the travel itinerary is displayed in an application program executing on a client computer, the facility receives from the application program an indication of how a user interacted with the displayed document. For example, the user may have placed a selection by moving a "cursor" within a first "Stop" node 102.

In response to receiving the notification of the user's selection of the node within the XML document, the facility determines whether the currently selected node is "significant." In some embodiments, the facility determines whether a node is significant by determining the existence of a transformation for the particular node. Stated another way, if a node has a corresponding transformation, the node is a significant node. Conversely, if a node does not have a corresponding transformation, the node is not a significant node. Once the facility determines whether the currently selected node is significant, the facility moves on to the parent of the currently selected node and determines whether the parent node is significant. In this manner, the facility works the hierarchical structure to identify parent nodes up the hierarchy until no further parent nodes are identified, and for each identified parent node, the facility determines whether the particular parent node is significant. The facility then applies each transformation procedure to its corresponding significant node to identify a context for the corresponding significant node. The facility then retrieves from the LOB system the information corresponding to each context—e.g., information related to the significant node—and displays the information to the user.

Continuing the travel itinerary example above, when the user places a selection by moving the cursor within the first Stop node 102, the facility displays information regarding BestInn hotels across the country, such as, by way of example, average room rates, information regarding rewards programs, etc. In this instance, the facility may determine that the current node—HotelName—is a significant node and retrieve and apply a transformation to the node to determine a context for the node. The facility then works up the hierarchy and determines that there are no parent nodes to process. Using the context for the current node, the facility may obtain information corresponding to the context—e.g., average room rates, information regarding rewards programs, etc.—and display this information to the user. The facility may retrieve the information corresponding to the context from the LOB system or from a local data store, such as a cache. For example, the facility may have previously retrieved the information corresponding to the context and stored it in cache memory.

In a similar manner, if the user then places a selection by moving the cursor into an "Address" node 104 inside or within the first Stop node 102, the facility may still display to the user the information regarding BestInn hotels across the country, but the facility may also obtain and display to the user information specific to Bellevue, such as, by way of example, climate information, restaurant information, etc., as well as information specific to the BestInn hotel in Bellevue, such as, by way of example, its AAA rating, amenities information, etc.

If the user places a selection by moving the cursor into an "Address" node 106 inside a third "Stop" node 108, the facility may obtain and display to the user information related to WonderfulResort locations in general, as well as the WonderfulResort located in Vancouver. In this instance, the facility may no longer display the information related to BestInn hotels and Bellevue, as the facility may deem this information unimportant for the current user selection. If the user then places a selection by moving the cursor inside a second "Stop" node 110, the facility recognizes the fact that Whistler is a ski resort and may obtain and display to the user information indicating, for example, the temperature, snow level, resorts related to that location, and the like. Moreover, the facility may no longer display the information related to WonderfulResort locations in general and in Vancouver, as the facility may deem this information to be unimportant for the current user selection.

In this way, the facility provides a powerful framework and tool for obtaining and displaying information related to the hierarchy of nodes in a hierarchical data structure that contain a current selection within the context of the hierarchy and/or the current selection. Moreover, embodiments of the facility obtain and display the related information without requiring intimate knowledge of the LOB systems on which the related information resides.

Even though the facility is described with reference to obtaining and displaying information related to the hierarchy of XML nodes in an XML document, it will be appreciated that the facility is not limited to only working with XML documents but, rather, that the facility as described herein is suitable for working with any hierarchical data structure.

Figure 2:
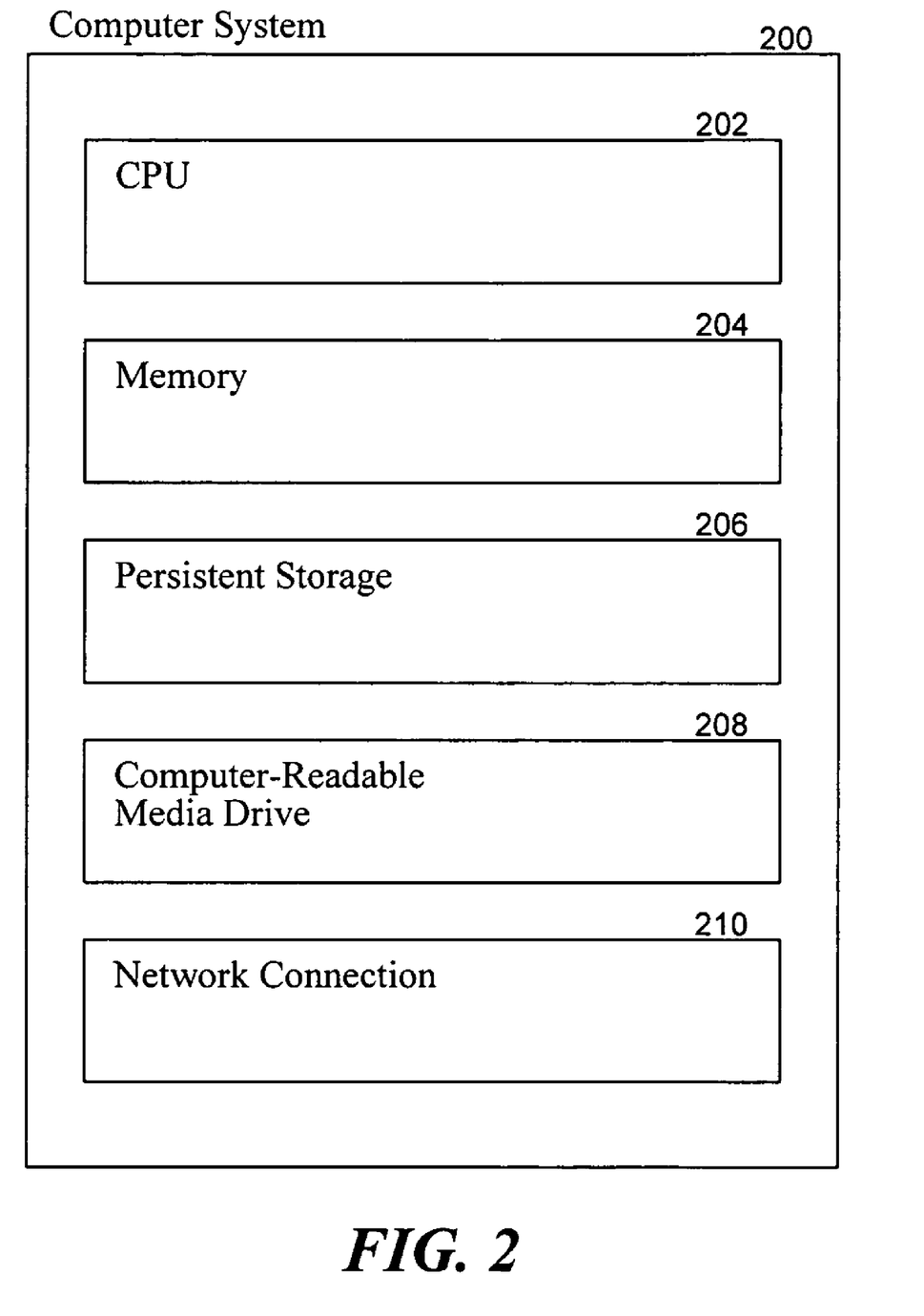
FIG. 2 is a block diagram illustrating selected components typically incorporated in at least some of the computer systems on which the facility executes.

FIG. 2 is a block diagram illustrating selected components typically incorporated in at least some of the computer systems on which the facility executes. These computer systems 200 may include one or more central processing units ("CPUs") 202 for executing computer programs; a computer memory 204 for storing programs and data—including data structures—while they are being used; a persistent storage device 206, such as a hard drive, for persistently storing programs and data; a computer-readable media drive 208, such as a CD-ROM drive, for reading programs and data stored on a computer-readable medium; and a network connection 210 for connecting the computer system to other computer systems, such as via the Internet, to exchange programs and/or data—including data structures.

The facility may be described in the general context of computer-readable instructions, such as program modules, executed by computer systems 200 or other devices. Generally, program modules include routines, programs, objects, components, data structures, etc. that perform particular tasks or implement particular abstract data types. Memory 204 and persistent storage device 206 are computer-readable media that may contain instructions that implement the facility. It will be appreciated that memory 204 and persistent storage 206 may have various other contents in addition to the instructions that implement the facility.

It will be appreciated that computer systems 200 may include one or more display devices for displaying program output, such as video monitors or LCD panels, and one or more input devices for receiving user input, such as keyboards, microphones, or pointing devices such as a mouse. While computer systems 200 configured as described above are typically used to support the operation of the facility, it will be appreciated that the facility may be implemented using devices of various types and configurations, and having various components.

In the discussion that follows, embodiments of facility are described in conjunction with a variety of illustrative examples. It will be appreciated that the embodiments of facility may be used in circumstances that diverge significantly from these examples in various respects.

Figure 3:
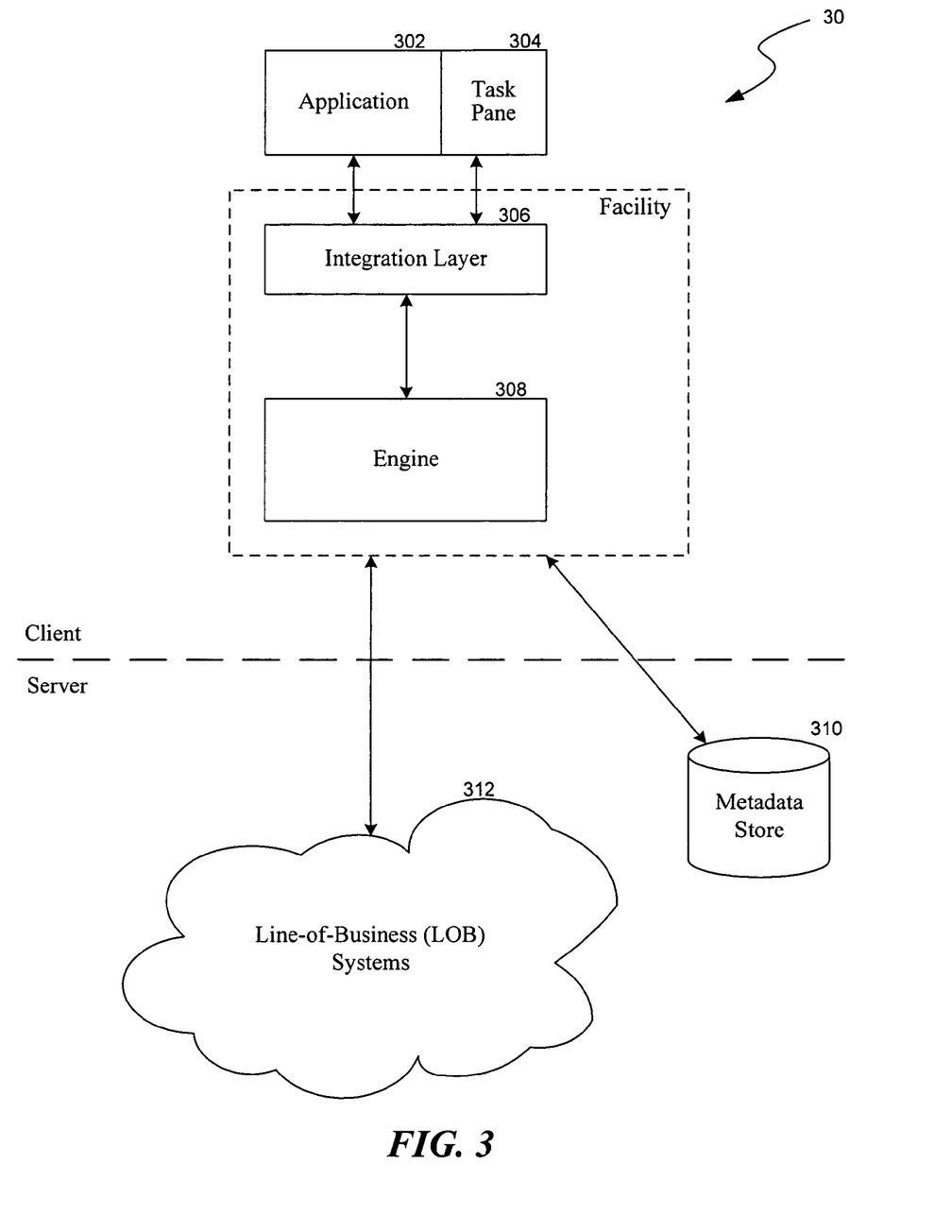
FIG. 3 is a high-level block diagram showing an environment in which the facility operates.

FIG. 3 is a high-level block diagram showing an environment 30 in which the facility may operate. Environment 30 comprises an application 302, a task pane 304, an integration layer 306, an engine 308, a metadata store 310, and a LOB systems 312. In some embodiments, the facility is comprised of integration layer 306 and engine 308 as indicated by the dotted or dashed lines, and the facility interacts with a host application—i.e., application 302 and task pane 304—and at least one LOB data provider or system—i.e., LOB systems 312—and metadata store 310. As illustrated in FIG. 3, application 302, task pane 304, integration layer 306 and engine 308 are depicted as client-side components, and metadata store 310 and LOB systems 312 are depicted as server-side components. As is generally known, client-side components typically reside on one or more client computers, and server-side components typically reside on one or more server computers.

Application 302 generally functions to display the hierarchical data structure and provide a user the ability to interact with the nodes in the displayed hierarchical data structure. In one embodiment, application 302 may be a Microsoft® Office System application. Task pane 304 generally functions to display the data—e.g., LOB data and/or actions—retrieved from a back-end system, such as LOB systems 312. Task pane 304 may be provided as a component of application 302. Alternatively, task pane 304 may be a separate window that is displayed independent of application 302.

Integration layer 306 generally functions as an interface layer that integrates the facility and, in particular, engine 308, to the host application. Integration layer 306 enables interoperability between the facility and application 302 and task pane 304 by, for example, managing the context-related events within a host application, requesting an action from engine 308, and processing and displaying data returned from engine 308. In some embodiments, integration layer 306 tracks a user's selection within a hierarchical document displayed by the host application; identifies the potentially significant XML nodes in the document; communicates with engine 308 to initiate a selection change; applies a transformation to a node and returns the data resulting from the transformation in a format that can be used as a reference; displays the information corresponding to a context in an appropriate order, for example, in task pane 304; caches the previously displayed information and reuses it as appropriate; and maintains—e.g., cleans, updates, etc.—the cached information.

Engine 308 generally functions to respond to selection changes received, for example, as requests from integration layer 306, and provide the appropriate metadata for the current selection, either from its internal cache or from metadata store 310. For example, engine 308 may obtain the metadata from metadata store 310 and cache the metadata on the client. The selection changes may be within either a document displayed in application 302 or task pane 304, itself. In some embodiments, engine 308, for each XML node deemed potentially significant by integration layer 306, processes the node to determine whether the node is indeed significant; obtains a transformation from, for example, metadata store 310, which can be used to transform the significant node into a reference; makes a request to, for example, integration layer 306 to apply the transformation to the significant node; and makes a request to, for example, integration layer 306 to display the information regarding the particular reference be displayed. Engine 308 and integration layer 306 may also maintain the correct ordering of requests—e.g., in order to reflect the hierarchy order in the corresponding information displayed in task pane 304. Engine 308 and integration layer 306 may further cache transformations in order to minimize communication with, for example, metadata store 310.

Metadata store 310 generally functions as a repository for the metadata that describes the entities, views, transformations, actions, objects, etc. exposed by LOB systems 312. In some embodiments, metadata store 310 is a relational database built in Microsoft® SQL Server™. In general terms, the metadata describes what is made available by LOB systems 312 and, thus, adds at least one layer of abstraction. For example, instead of exposing the actual objects, a LOB system provider makes available the metadata that describes the objects. In this manner, the LOB system provider provides a uniform way to access those objects described by the metadata without requiring intimate knowledge of the internal structure of the objects themselves. Thus, a consumer of such metadata only needs knowledge of the structure of the metadata to access the object, but not the data itself. The provided metadata may be maintained in metadata store 310. One technical advantage of providing the metadata and not the actual data and actions stored on the LOB data store and described by the provided metadata is that the LOB system providers are able to extend and modify the context of the metadata—e.g., the data, actions, etc.—without impacting the client-side components. Moreover client-side application developers, having knowledge of the structure of the metadata, are able to develop application solutions that interact with LOB systems 312 without intimate knowledge of LOB systems 312, including the data, actions, etc. actually made available by LOB systems 312.

In general terms, LOB systems 312 are large computer applications, such as accounting and resource planning applications, which assist in the running of an enterprise. LOB systems 312 typically contain a number of integrated capabilities and services and tie into databases and database management systems. As such, in some embodiments, LOB systems 312 generally function as back-end databases that contain the data related to a document that is displayed by, for example, application 302. In particular, LOB systems 312 make available the data and actions that are described by the metadata.

The aforementioned aspects of the facility are only illustrative and are not intended to suggest any limitation as to the implementation of the illustrated components and/or the scope of use or functionality of the facility, including the illustrated components of the facility. For example, in various embodiments, integration layer 306 and/or engine 308 may perform other operations in addition to those discussed above. Moreover, these operations may be performed by one or more components of integration layer 306 and/or engine 308.

Figure 4:
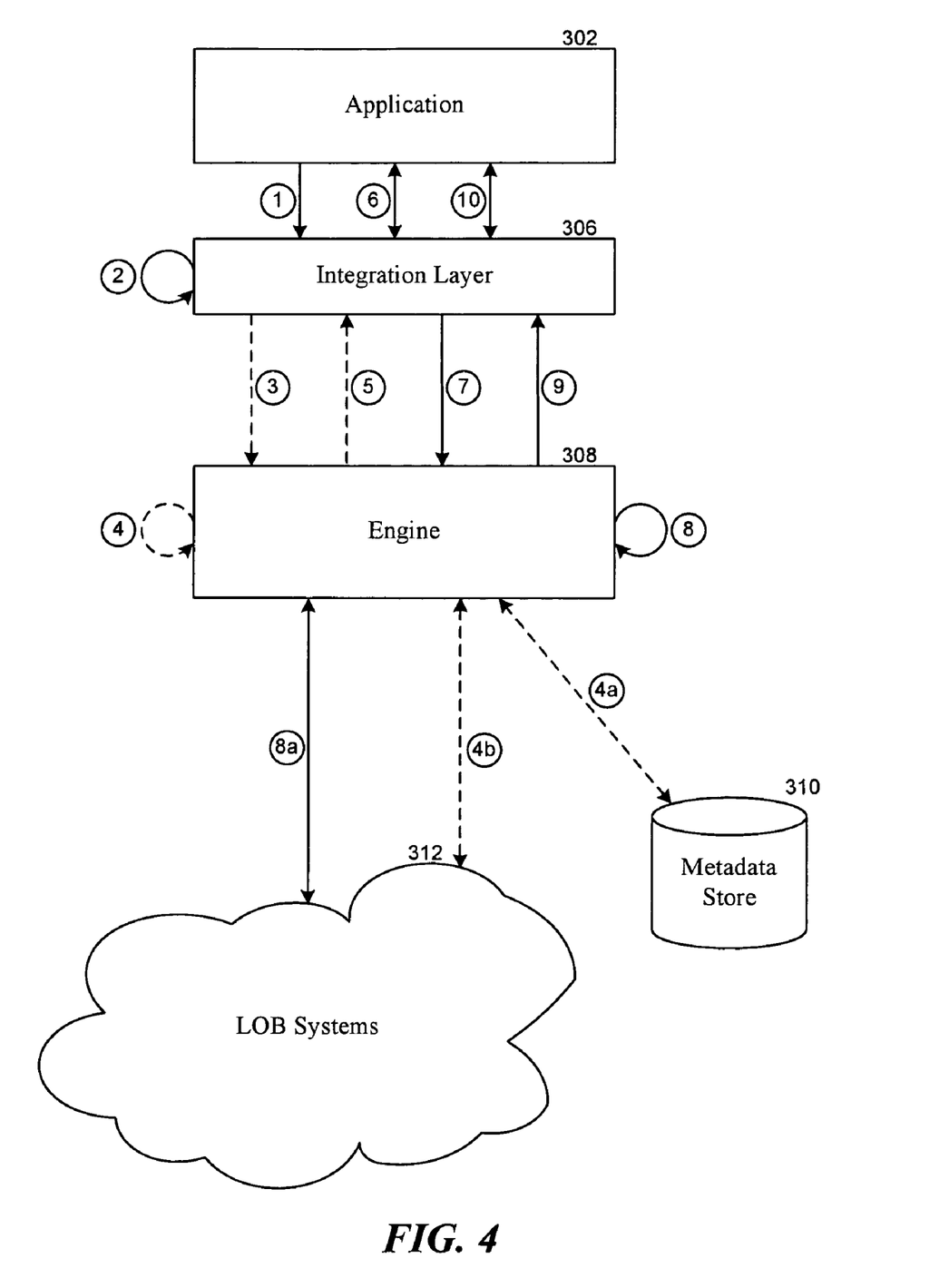
FIG. 4 is a block diagram illustrating a communications flow used by the facility in some embodiments to respond to a change in a user's selection in a displayed document.

FIG. 4 is a block diagram illustrating a communications flow used by the facility in some embodiments to respond to a change in a user's selection in a displayed document. Referring again to the above travel itinerary example, a user may be viewing the XML document containing the travel itinerary in application 302. While viewing the XML document, the user may have selected Address node 104 in the first Stop node 102 by positioning the cursor within node 104. In response to the user's selection, interaction layer 306 receives a notification of how the user interacted with the document from application 302 (Stage 1). For example, interaction layer 306 receives an indication of the currently selected node—i.e., node 104.

In response receiving the notification, interaction layer 306 identifies or specifies a context, for example, from metadata store 310, for the currently selected node (Stage 2). The contexts may have been previously provided by the LOB system provider(s). Interaction layer 306 also determines whether the currently selected node has any parents, including grandparents, great grandparents, etc., and also identifies a context for each identified parent. Continuing the above example, the currently selected node, node 104, has one parent node, node 102. Thus, interaction layer 306 identifies a context from metadata store 310 for the identified parent node.

Having identified the context for the currently selected node and each of the parent nodes, interaction layer 306 uses or processes the context(s) to determine whether the node(s) associated with or corresponding to the context(s) are significant. In one embodiment, a node is a significant node if its context includes a metadata representation of a transformation. Thus, interaction layer 306 processes each of the identified contexts to determine whether a context includes a transformation. If a context does not include a transformation, the node associated with the context is deemed an insignificant node and ignored—e.g., not processed any further. If, on the other hand, a context includes a transformation, the node associated with the context is deemed a significant node. For each significant node, integration layer 306 determines whether the corresponding transformation is in cache memory. For example, the transformation may have been cached during a prior operation that involved the transformation. If the transformation is in cache memory, integration layer 306 uses the cached transformation.

Alternatively, if integration layer 306 determines that the transformation was not cached, integration layer 306 passes the context—i.e., the context that specifies a transformation that was not cached—to engine 308 (Stage 3). In one embodiment, interaction layer 306 passes to engine 308 a pointer to the context. In response to receiving the context from integration layer 306, engine 308 processes the context to retrieve the transformation (Stage 4) from either metadata store 310 (Stage 4a) or LOB system 312 (Stage 4b). In some embodiments, the context includes an indication of the location of the transformation. Subsequent to retrieving the transformation for the context, engine 308 passes the transformation to interaction layer 306 (Stage 5). In like manner, engine 308 retrieves the transformations for the significant nodes that are not already in cache memory. Thus, as indicated by the dashed or dotted lines in FIG. 4, Stages 3, 4, 4a, 4b, and 5 are conditional stages that are bypassed or not performed if a transformation for a significant node was cached.

Interaction layer 306 applies each transformation to its corresponding significant node and obtains the relevant information/data that is in the document (Stage 6). In some embodiments, the application of a transformation to its corresponding significant node results in a context, which contains an action, and an item of data from the document. The data may be a single item of data, such as a single item of information about a city, employee, etc., or a "bundled" item of data, such as multiple items of information about a city (e.g., population and current weather, information about a city and a hotel in the city, information specific to a hotel located in a city and to the particular chain of hotel in general irregardless of location, multiple items of information about an employee, etc.). The specified action includes instructions (in the form of operations) about obtaining a transformation, obtaining the LOB data, such as data about a hotel—e.g., room rates, AAA rating, user reviews, etc.,—combining the items of data in one piece of data, displaying the information, and the like.

Continuing the travel itinerary example, applying the transformation to node 104 may result in a context that includes an entity in the metadata that refers to the current weather condition in the city indicated by node 104, a view which specifies how to display the information/data—e.g., current weather condition—to the user, and an action—e.g., a sequence of operations that is executed, for example, to obtain and display the information,—and the item of data may be an indication of the specified city, Bellevue. Applying the transformation to node 104 may also result in a bundled item of data, such as a context that includes an entity in the metadata that refers to the current weather condition in the city indicated by node 104, restaurant information in the city indicated by node 104, and the current AAA rating for the BestInn hotel located in the city indicated by node 104, a view and an action, and the item of data may be an indication of the specified city, Bellevue. Likewise, applying the transformation to node 102 may result in a context that includes an entity in the metadata that refers to the average room rates for the hotel indicated by node 102, a view and an action, and the item of data may be an indication of the specified hotel, BestInn. Applying the transformation to node 102 may also result in a bundled item of data, such as a context that includes an entity in the metadata that refers to the average room rates for the hotel indicated by node 102 and a list of cities in which the hotel indicated by node 102 is located, a view and an action, and the item of data may be an indication of the specified hotel, BestInn. In this manner, the combination of the metadata contained in the entity, view, action and the item of data—e.g. BestInn—specifies where/how to get the "final" information.

Interaction layer 306 passes the context(s) obtained from applying the transformations to engine 308 (Stage 7). In response to receiving the context(s), engine 308 executes according to or as specified by the received context(s)—e.g., executes the actions specified in the contexts with the specified item of data as a parameter (Stage 8). In some embodiments, executing according to a received context may involve retrieving one or more items of information from LOB systems 312 (Stage 8a). In this instance, engine 308 may retrieve the items of information from LOB systems 312, pass the retrieved information to interaction layer 306 and request that interaction layer 306 display the newly obtained information (Stage 9). The newly obtained information may be items of data or actions—e.g., metadata representations of actions. Continuing the travel itinerary example, engine 308 may execute according to the received contexts and retrieve from LOB systems 312 items of information that represent the current weather condition in Bellevue, the current AAA rating for the BestInn hotel located in Bellevue, and the average room rates for BestInn hotels in general. Engine 308 may request that interaction layer 306 display the retrieved information about the current weather condition in Bellevue, the current AAA rating for the BestInn hotel located in Bellevue, and the average room rates for BestInn hotels in general. Moreover, engine 308 may also have retrieved one or more actions and request that interaction layer 306 display one or more corresponding menu items, which, when clicked by a user, cause the corresponding actions to be executed.

In response to the request to display the newly obtained information, interaction layer 306 checks to determine whether the corresponding information is already displayed, for example, in task pane 304 as visual elements (Stage 10). If the information is already displayed, interaction layer 306 may check to ensure that the displayed information is correctly ordered, for example, to substantially match the hierarchical structure of the corresponding nodes in the document. If the information is not correctly ordered, interaction layer 306 rearranges the ordering of the information in the display. Alternatively, if interaction layer 306 determines that the newly obtained information is not currently displayed, interaction layer 306 displays the newly obtained information. This may involve removing from the display one or more visual elements that correspond to information that was being previously displayed and is no longer relevant according to the new contexts.

Those of ordinary skill in the art will appreciate that the functions and operations performed in the aforementioned process may be implemented in differing order. Furthermore, the outlined stages are only exemplary, and some of the stages may be optional, combined with fewer stages, or expanded into additional stages without detracting from the essence of the invention.

From the foregoing, it will be appreciated that embodiments of the invention have been described herein for purposes of illustration, but that various modifications may be made without deviating from the spirit and scope of the invention. Accordingly, the invention is not limited except in accordance with elements explicitly recited in the appended claims.

We claim:

1. A computer-readable storage medium having stored thereon computer instructions that, when executed by a computer, cause the computer to perform steps comprising:
    detect a selection of a node in a hierarchical data structure;
    determine whether the node is a significant node by determining whether the node has a corresponding mapping that describes how to obtain additional information, the mapping including metadata describing how to obtain a location of exposed data objects in a data source;
    responsive to determining that the node is a significant node:
        transform the significant node based on the mapping into a format suitable for retrieving the additional information related to the significant node from the data source, wherein the format suitable for retrieving the additional information includes a metadata context and at least one item of data from the hierarchical data structure that describe the location of the exposed data objects in the data source; and
        obtain the exposed data objects from the data source based on the transformed significant node in the format suitable for retrieving the additional information related to the significant node.

2. The computer-readable storage medium of claim 1, wherein the additional information is retrieved from a back-end system.

3. The computer-readable storage medium of claim 1, wherein the additional information includes an item of data.

4. The computer-readable storage medium of claim 1, wherein the additional information includes a metadata representation of an action.

5. The computer-readable storage medium of claim 1, wherein the additional information is obtained by executing according to the context.

6. The computer-readable storage medium of claim 1 further comprising computer instructions that, when executed by a computer, cause the computer to display the additional information.

7. The computer-readable storage medium of claim 6, wherein the additional information is displayed in a task pane.

8. The computer-readable storage medium of claim 6, wherein the additional information is displayed in order.

9. The computer-readable storage medium of claim 1 further comprising computer instructions that, when executed by a computer, cause the computer to:
    traverse the hierarchical data structure to identify any parent nodes of the node;
    determine whether any of the identified parent nodes are significant nodes;
    for each parent node determined to be a significant node:
        transform the significant parent node into a format suitable for retrieving additional information related to the significant parent node, wherein the format suitable for retrieving the additional information includes a context and at least one item of data from the hierarchical data structure; and
        obtain the additional information related to the significant parent node.

10. A computer-readable storage medium having stored thereon computer instructions that, when executed by a computer, cause the computer to:
    receive an indication of a currently selected node within a hierarchical data structure in an XML document;
    identify a first context for the currently selected node, the first context includes at least one of a metadata scope, a metadata entity, a metadata view, a metadata transformation, and a metadata reference schema associated with the currently selected node, wherein the metadata transformation includes a XSLT fragment applicable to the hierarchical data structure in the XML document;
    determine, from the first context, whether the currently selected node is a significant node by determining whether the first context includes a metadata transformation that describes how to obtain or filter data in the XML document to determine a metadata representation of exposed data objects in a data source;
    responsive to determining that the currently selected node is a significant node:
        process the significant node according to the metadata transformation to generate a second context different from the first context for the selected node, the second context including the metadata representation of the exposed data objects in the data source; and
        execute according to the second context to retrieve the exposed data objects from the data source.

11. The computer-readable storage medium of claim 10 further comprising computer instructions that, when executed by a computer, cause the computer to:
    traverse the hierarchical data structure to identify any parent nodes of the currently selected node;
    identify a corresponding first context for each of the identified parent nodes;
    determine, from each of the first contexts, whether the corresponding parent node is a significant node;
    for each parent node determined to be a significant node:

process the significant parent node to generate a corresponding second context; and
execute according to the second context.

12. The computer-readable storage medium of claim 10, wherein the second context specifies an action.

13. The computer-readable storage medium of claim 10, wherein the first context includes a reference to a metadata representation of an exposed object.

14. The computer-readable storage medium of claim 13, wherein the object is exposed by a LOB system.

15. The computer-readable storage medium of claim 10, wherein the currently selected node is determined to be a significant node by an indication of a transformation in the first context.

16. The computer-readable storage medium of claim 10, wherein the second context is generated by applying a transformation to the significant node, the transformation indicated in the first context associated with the significant node.

17. The computer-readable storage medium of claim 16, wherein the application of the transformation results in an identification of at least one item of relevant data in the hierarchical data structure.

18. The computer-readable storage medium of claim 10, wherein executing according to the second context includes obtaining additional information related to the currently selected node.

19. The computer-readable storage medium of claim 18, wherein the additional information is obtained from a back-end data store.

20. The computer-readable storage medium of claim 18, wherein the additional information is obtained from cache.

21. The computer-readable storage medium of claim 18, wherein the additional information includes at least one item of data.

22. The computer-readable storage medium of claim 18, wherein the additional information includes an action.

23. A method in a computing system having a processor operatively coupled to a data source for obtaining information related to a currently selected node in a hierarchical data structure, the method comprising:
  detecting a selection of a node in the hierarchical data structure in a document with the processor;
  identifying a first set of metadata associated with the selected node with the processor;
  determining whether the first set of metadata includes a corresponding mapping that describes how to obtain a second set of metadata based on the selected node, the second set of metadata being different from the first set of metadata and including metadata describing how to obtain a location of exposed data objects in the data source;
  responsive to determining that the node id a significant node:
    applying the mapping to the selected node with the processor by transforming the significant node based on the mapping into a format suitable for retrieving the additional information related to the significant node from the data source, wherein the format suitable for retrieving the additional information includes a metadata context and at least one item of data from the hierarchical data structure that describe the location of the exposed data objects in the data source; and
    retrieving additional data associated with the selected node by obtaining the exposed data objects from the data source based on the transformed significant node in the format suitable for retrieving the additional information related to the significant node.

24. The method of claim 23 wherein the document is a first document, and wherein determining whether the first set of metadata includes a mapping includes determining whether the first set of metadata includes a XSLT fragment usable to construct a second document different from the first document based on the first document.

25. The method of claim 24 wherein applying the mapping to the selected node includes applying the XSLT fragment to the first document to construct the second document.

26. The method of claim 23 wherein identifying a first set of metadata includes retrieving the first set of metadata associated with the selected node from a metadata store, and wherein retrieving additional data includes retrieving the additional data associated with the selected node according to the second set of metadata from a LOB server.

27. The method of claim 26 wherein the LOB server contains objects associated with the additional data, and wherein the method further comprises exposing the second set of metadata instead of exposing the objects in the LOB server.

28. The method of claim 26 wherein the additional data is a first set of additional data, and wherein the method further comprises allowing modification of the second set of metadata to be associated with a second set of additional data in the LOB server without impacting the hierarchical data structure of the document, the second set of additional data being different from the first set of additional data.

29. The method of claim 26, further comprising:
  checking the hierarchical structure for a parent node of the selected node;
  applying the identifying, determining, and retrieving operations to the parent node; and
  repeating the checking and applying operations until a root node is reached.

30. A computing system comprising a processor and a computer-readable storage medium having stored thereon computer instructions that, when executed by the processor, cause the processor to perform a method according to claim 23.

31. The method of claim 23 wherein detecting a selection of a node includes detecting a selection of a node in a client application separate from the data source, and wherein the method further comprises maintaining the first and second metadata sets in a metadata store and allowing modification of at least one of the first and second metadata sets without impacting the client application.

* * * * *

UNITED STATES PATENT AND TRADEMARK OFFICE
CERTIFICATE OF CORRECTION

| | | |
|---|---|---|
| PATENT NO. | : 7,499,928 B2 | Page 1 of 1 |
| APPLICATION NO. | : 10/966944 | |
| DATED | : March 3, 2009 | |
| INVENTOR(S) | : Alexandru D. Burst et al. | |

It is certified that error appears in the above-identified patent and that said Letters Patent is hereby corrected as shown below:

In column 12, line 37, in Claim 29, delete "26," and insert -- 23, --, therefor.

Signed and Sealed this
Tenth Day of May, 2011

David J. Kappos
*Director of the United States Patent and Trademark Office*